United States Patent [19]
Davis

[11] Patent Number: 5,819,491
[45] Date of Patent: *Oct. 13, 1998

[54] MODULAR CONSTRUCTION ELEMENTS

[75] Inventor: Harry H. Davis, Mooresville, N.C.

[73] Assignee: L.B. Plastics Limited, Derby, England

[ * ] Notice: The term of this patent shall not extend beyond the expiration date of Pat. No. 5,647,184.

[21] Appl. No.: 798,828

[22] Filed: Feb. 12, 1997

Related U.S. Application Data

[63] Continuation-in-part of Ser. No. 589,728, Jan. 22, 1996, Pat. No. 5,647,184.

[51] Int. Cl.$^6$ .................................. E04C 3/00; E04B 5/00
[52] U.S. Cl. .......................... 52/592.1; 52/588.1; 52/177; 52/650.3; 52/100; 52/731.3; 52/732.2
[58] Field of Search ................................ 52/588.1, 589.1, 52/591.1, 592.1, 100, 177, 650.3, 730.5, 731.3, 732.2; 114/263, 266

[56] References Cited

U.S. PATENT DOCUMENTS

| | | |
|---|---|---|
| Re. 31,368 | 9/1983 | Trumper . |
| 1,913,342 | 6/1933 | Schaffert . |
| 3,043,407 | 7/1962 | Marryatt . |
| 3,100,556 | 8/1963 | De Ridder . |
| 3,432,147 | 3/1969 | Schreyer et al. . |
| 3,440,791 | 4/1969 | Troutner . |
| 3,555,762 | 1/1971 | Costanzo, Jr. . |
| 3,640,191 | 2/1972 | Hendrich . |
| 3,680,711 | 8/1972 | Brucker . |
| 3,707,819 | 1/1973 | Calhoun et al. . |
| 3,863,417 | 2/1975 | Franchi . |
| 3,914,913 | 10/1975 | Roberts . |
| 3,968,616 | 7/1976 | Gostling . |
| 4,235,197 | 11/1980 | Curtis et al. . |
| 5,048,448 | 9/1991 | Yoder . |
| 5,052,159 | 10/1991 | Shvartsburd . |

(List continued on next page.)

FOREIGN PATENT DOCUMENTS

| | | |
|---|---|---|
| 19 66 366 U | 8/1967 | Germany . |
| 19 82 048 U | 3/1968 | Germany . |
| 70 42 144 U | 11/1970 | Germany . |
| 21 01 782 A | 7/1972 | Germany . |
| 4062646 | 9/1949 | Japan ..................................... 52/588.1 |
| 0834138 | 5/1960 | United Kingdom .................. 52/588.1 |
| 1004439 | 9/1965 | United Kingdom . |
| 1080040 | 8/1967 | United Kingdom . |

OTHER PUBLICATIONS

Heritage Marine, *Classic Beauty Maintenance Free Durability*, Submitted Pages, Published prior to Jan. 22, 1996, Macon, MS.

Brock Manufacturing,*Maintenance–Free Savings. Enhanced Property Appearance.*, Submitted Pages, Published prior to Jan. 22, 1996, Milford, IN.

Mobil Chemical Company, *Trex Wood–Polymer Composite—An Innovative Material From Mobil For Virtually Maintenance–Free Decking And Landscaping.*, Submitted Pages, Published prior to Jan. 22, 1996, Norwalk, CT.

Heritage Vinyl Products, *Teck Deck—Vinyl . . . Is Final.*, Entire Brochure, Published prior to Jan. 22, 1996.

Primary Examiner—Robert Canfield
Attorney, Agent, or Firm—Adams Law Firm, P.A.

[57] ABSTRACT

An elongate modular decking plank is provided for assembly on a supporting subfloor together with a plurality of like planks to form a decking structure. The decking plank has a top wall spaced-apart from a bottom wall, and opposing laterally spaced downwardly converging side walls interconnecting the top and bottom walls. An integrally-formed flange extends outwardly from the bottom wall on one of said sides of the decking plank. The flange includes a fastening portion for receiving fasteners therethrough to the supporting subfloor to mount the decking plank on the supporting subfloor, and a connecting portion for connecting the plank to an adjacent like plank in a manner which permits limited lateral and angular adjustment between adjacent planks. The plank is preferably extruded from high-impact polymeric material, such as PVC plastic.

11 Claims, 9 Drawing Sheets

U.S. PATENT DOCUMENTS

| | | |
|---|---|---|
| 5,088,910 | 2/1992 | Goforth et al. . |
| 5,159,788 | 11/1992 | Merrick . |
| 5,204,149 | 4/1993 | Phenicie et al. . |
| 5,274,977 | 1/1994 | Bayly . |
| 5,314,940 | 5/1994 | Stone . |
| 5,346,759 | 9/1994 | Will . |
| 5,351,458 | 10/1994 | Lehe . |
| 5,361,554 | 11/1994 | Bryan . |

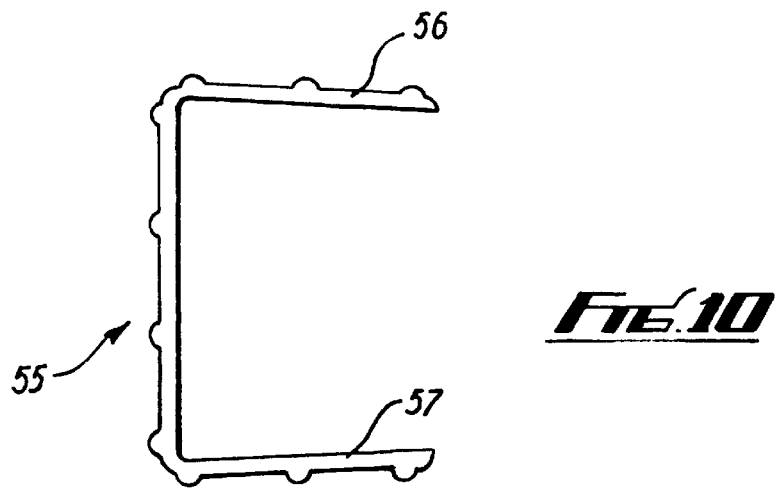
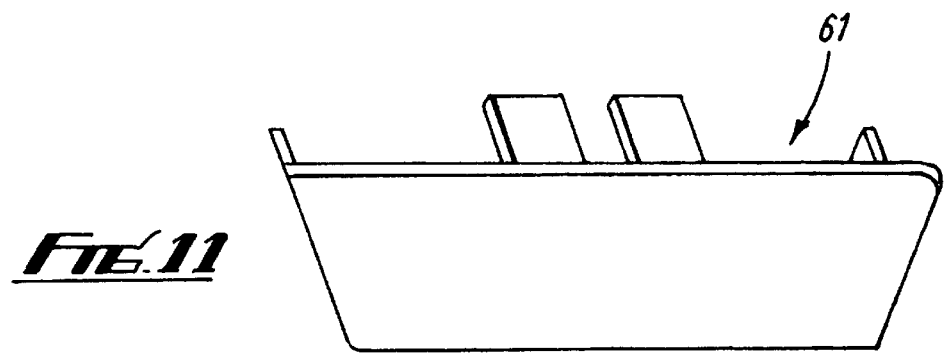
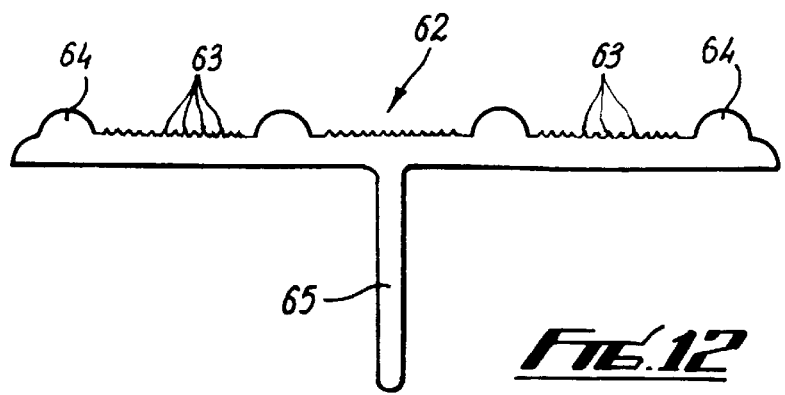

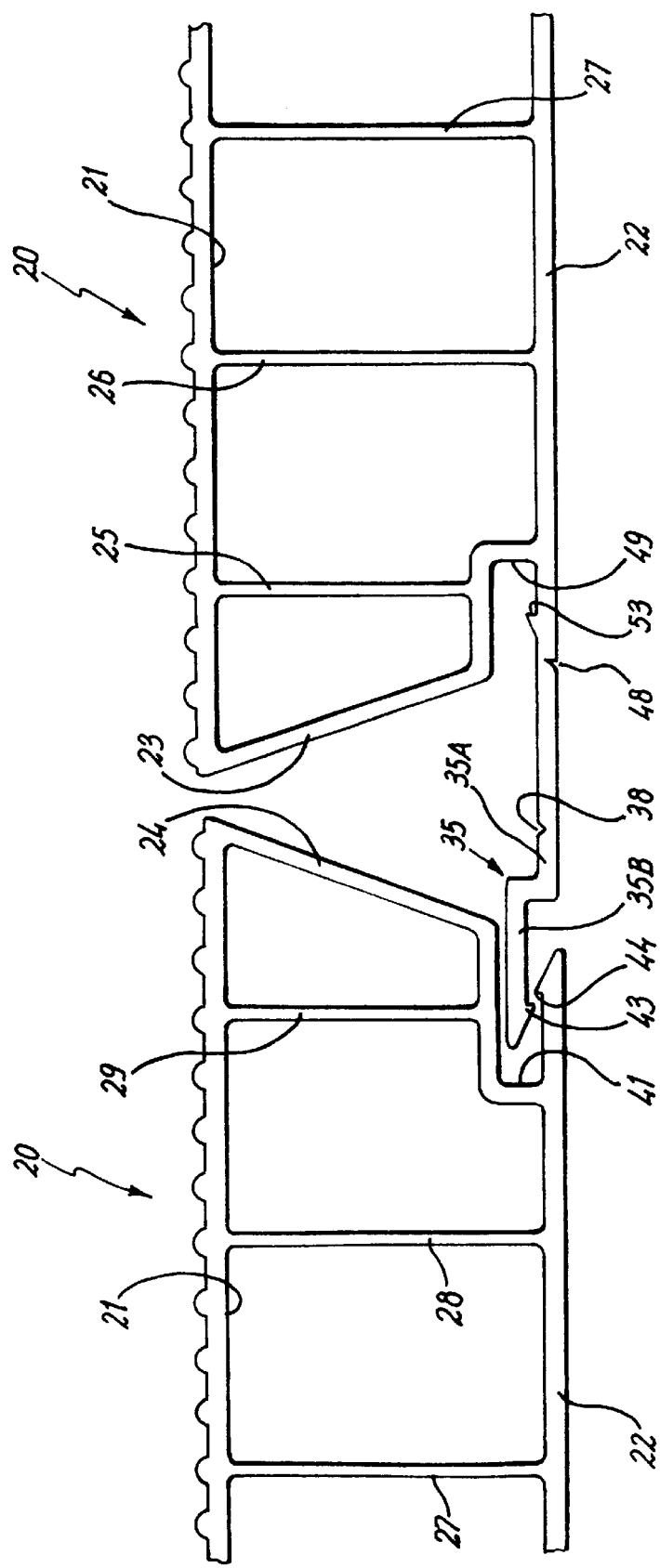

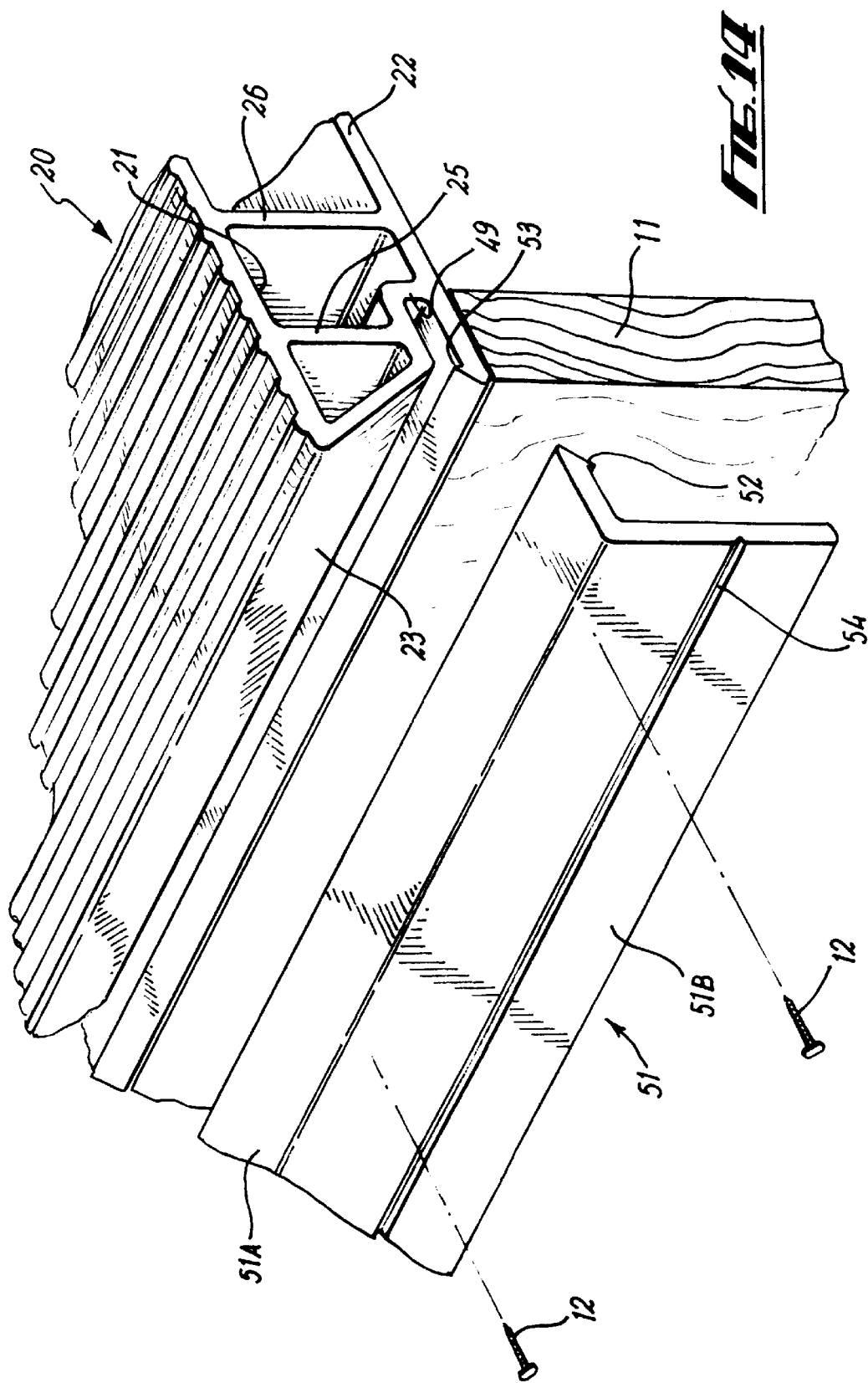

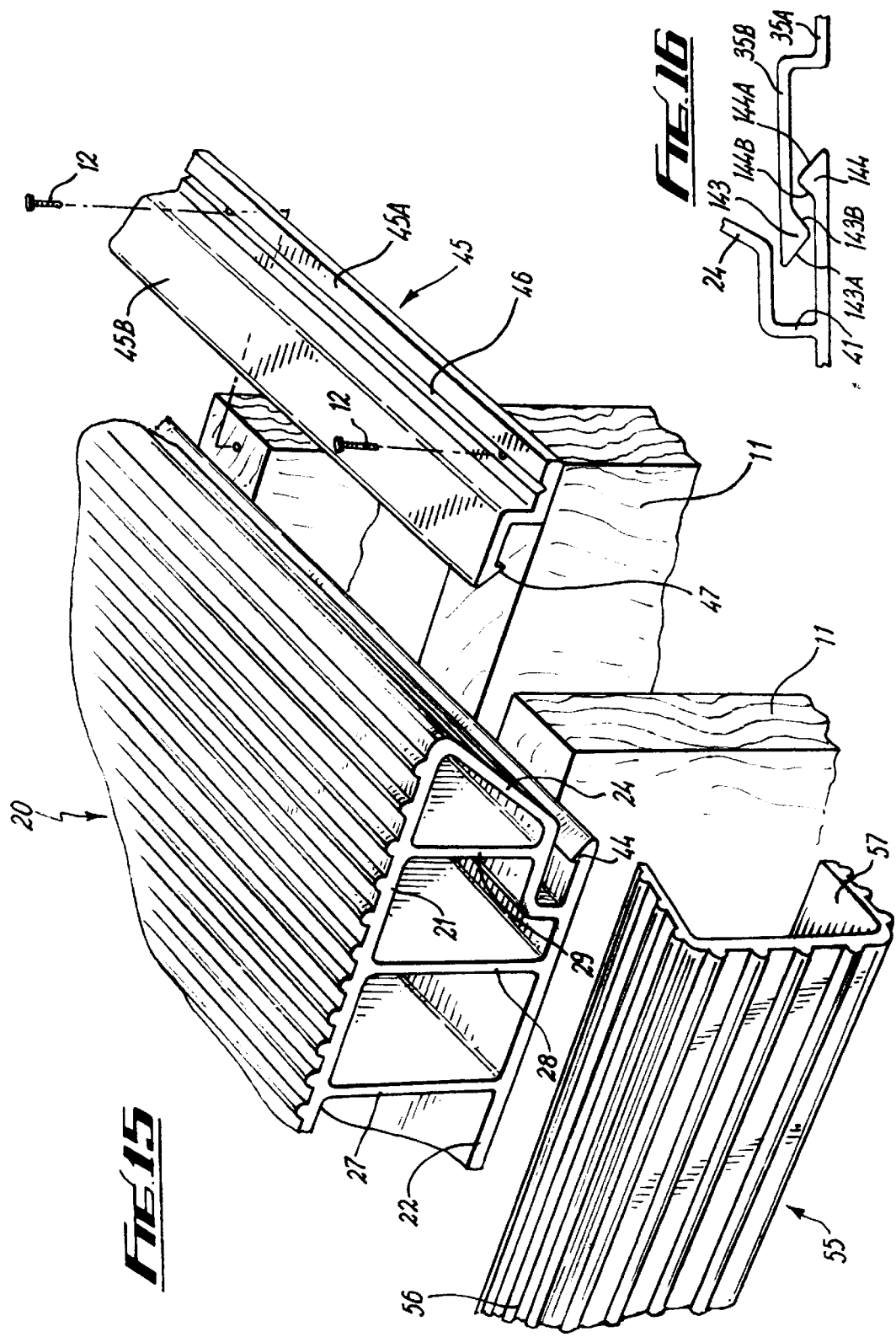

MODULAR CONSTRUCTION ELEMENTS

This application is a Continuation-in-Part of Ser. No. 08/589,728 filed Jan. 22, 1996, now U.S. Pat. No. 5,647,184.

TECHNICAL FIELD AND BACKGROUND OF THE INVENTION

This invention relates to modular construction elements in the nature of planks and to structures formed from an assembly of such planks. The invention is applicable, for example, in the construction of boat docks, piers, decks, patios, walkways, pontoon boat floors, and the like.

According to one prior art plastic decking plank, separate cap and base elements are snapped together to form a single plank. The base element is first mounted directly to the subfloor with fasteners such as screws or nails. Mating components of the cap and base elements are then manually aligned, and a rubber hammer or other tool is used to snap-attach the pieces together. Unlike the invention, such two-piece designs generally require substantial time and effort to assemble. The present one-piece design results in a considerably stronger and more rigid decking structure than a two-piece design while minimizing manufacturing and installation costs. In addition, due to the absence of engaging parts, the invention also produces less surface noise or squeaking than two-piece designs.

SUMMARY OF THE INVENTION

It is an object of the invention to provide a modular, one-piece plastic construction element which may be readily assembled together with a number of like elements to form a decking or other structure.

It is another object of the invention to provide a modular decking plank which includes complementary, integrally-formed male and female fastener components.

It is another object of the invention to provide a modular decking plank which is relatively inexpensive to manufacture.

It is another object of the invention to provide a decking plank which includes hidden fasteners located below the top surface of the decking structure for mounting the plank to a supporting subfloor.

According to the invention there is provided an elongate modular construction element for assembly with a plurality of like elements to form a structure such as decking, said element being in the nature of a plank comprising spaced top and bottom walls interconnected by opposed side walls to define a void therein, first connecting means projecting outwardly beyond one of first and second sides of the plank, second connecting means complementary to said first connecting means being formed at the opposite side of the plank whereby two such planks may be connected together in side by side relation, said connecting means being adapted to permit limited sliding movement of adjacent planks relative to one another in a direction transverse to the lengths of the planks and limited angular movement about an axis extending parallel to the lengths thereof, whereby to permit the top walls of adjacent planks to be angularly inclined relative to one another to accommodate irregularities in a base or other supporting structure on or by which the resultant decking or other structure is supported.

Preferably said connecting means are located adjacent the bottom wall of and extend continuously along the plank from one end thereof to the other. Preferably also said first connecting means comprises a laterally projecting flange including a fastening portion for receiving fasteners therethrough for attaching the plank to said supporting structure.

Preferably said second connecting means comprises a channel extending adjacent said bottom wall at the opposite side of the decking plank from said first connecting means for receiving a connecting portion of said flange.

The invention also provides a decking or other structure formed from a plurality of interconnected modular construction elements as aforesaid.

BRIEF DESCRIPTION OF THE DRAWINGS

An embodiment of the invention will now be described, by way of example only, with reference to the accompanying drawings, in which:

FIG. 10 is an end view of an elongate cap member for attachment to exposed ends of the decking planks;

FIG. 11 is a perspective view of an alternative end cap for attachment to a distal end of a single decking plank;

FIG. 12 is an end view of an elongate T-section for positioning adjacent to abutting ends of the decking planks;

FIG. 13 is a cross-sectional view of two adjacent decking planks attached together;

FIG. 14 is an enlarged fragmentary perspective view showing a decking trim according to FIG. 9 positioned for attachment to a decking plank adjacent an exposed side edge of the decking structure;

FIG. 15 is an enlarged fragmentary perspective view showing a flange according to FIG. 8 used for beginning decking construction, and a cap member according to FIG. 10 positioned for attachment to a decking plank; and FIG. 16 is an enlarged fragmentary view showing a modified form of connecting means.

DESCRIPTION OF THE PREFERRED EMBODIMENT AND BEST MODE

Figure 1:
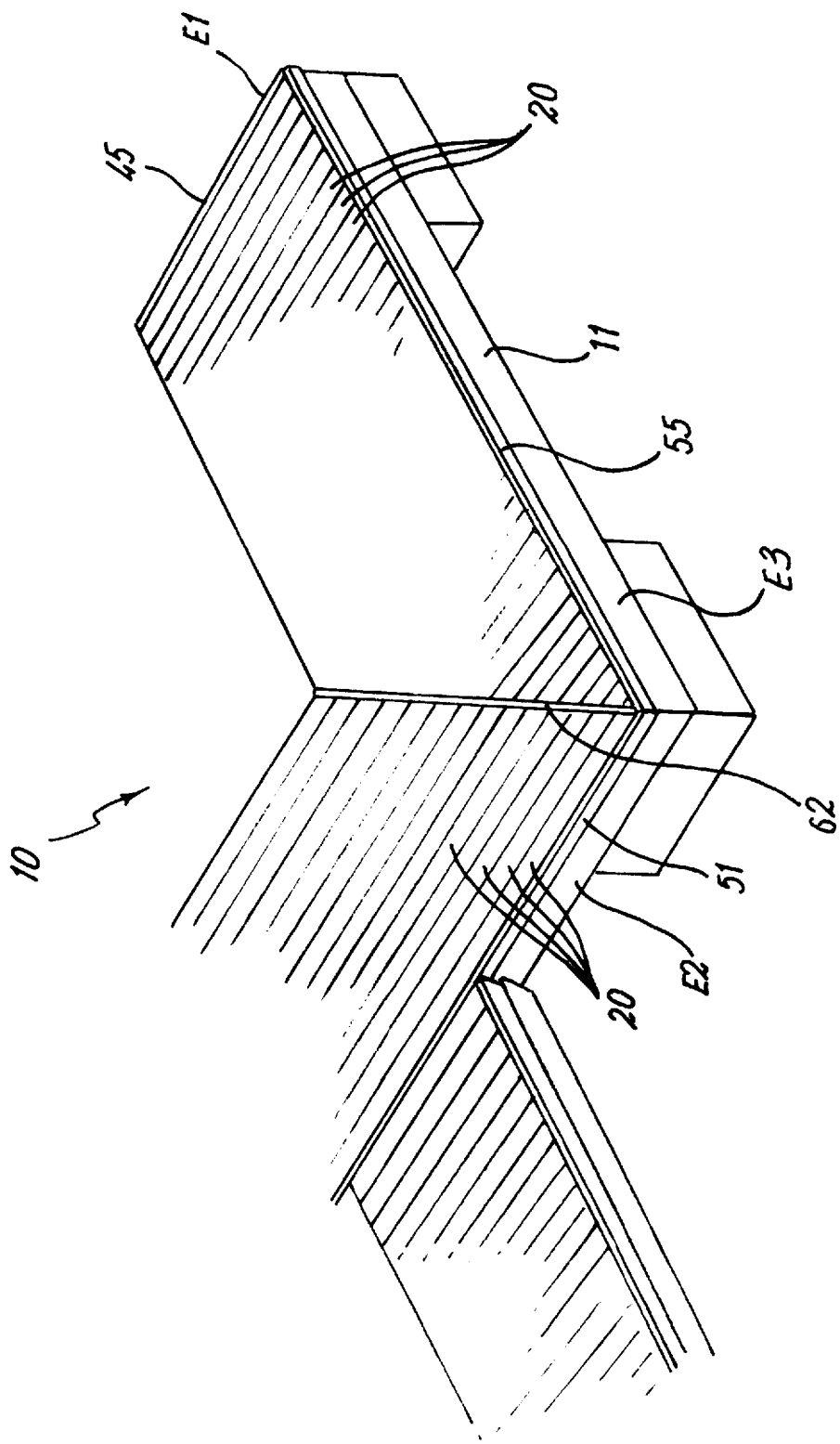
FIG. 1 is a fragmentary perspective view of a decking structure comprising an assembly of decking planks according to one embodiment of the invention.
Figure 2:
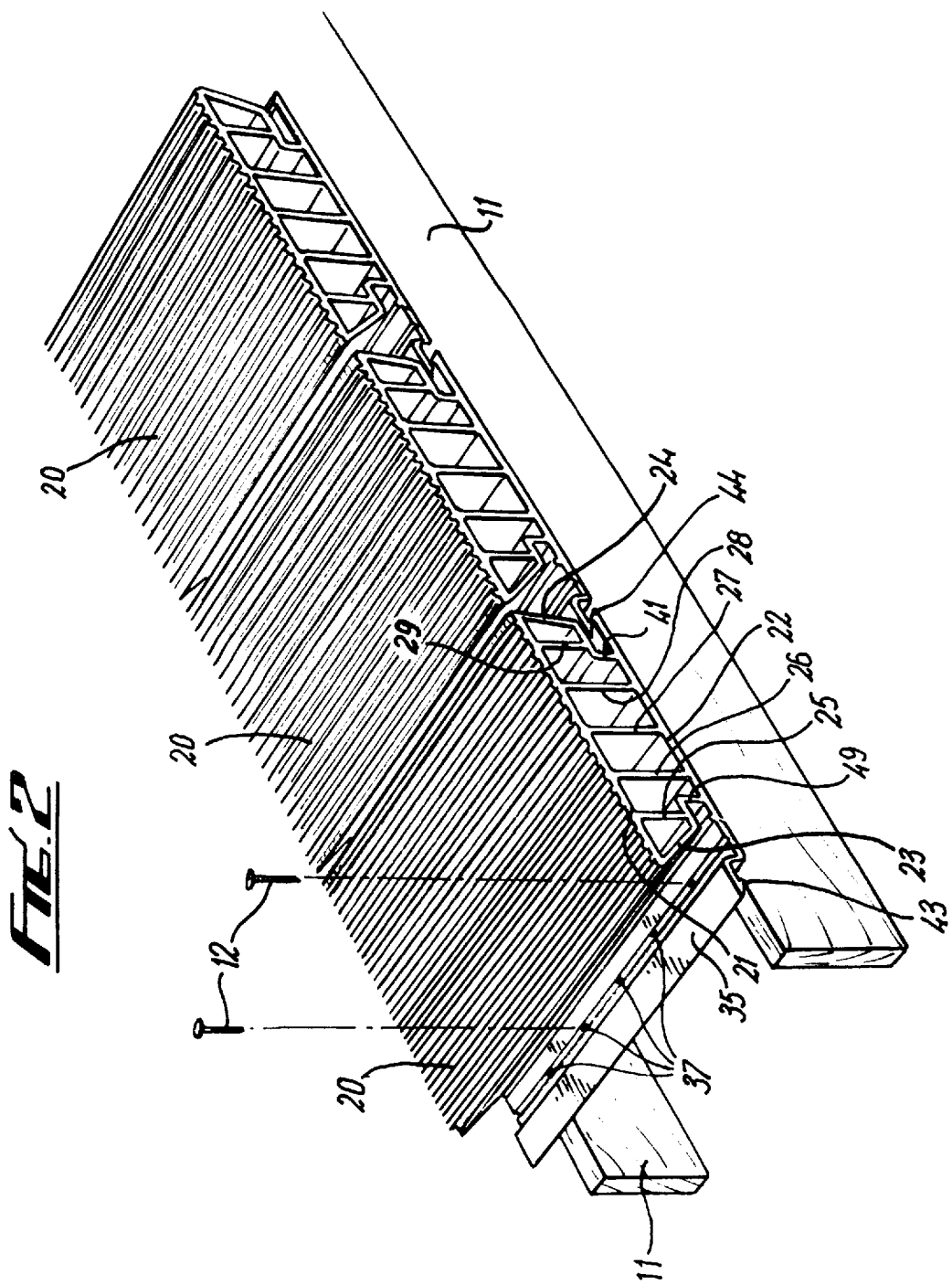
FIG. 2 is a fragmentary perspective view of a number of decking planks mounted on joists of a supporting subfloor, showing the connecting means for locking adjacent planks together.

Referring to the drawings, a decking structure according to the present invention is illustrated in FIG. 1 and shown generally at 10. The decking structure 10 is constructed of an assembly of one-piece modular construction elements in the form of decking planks 20 mounted on supporting joists 11 of a subfloor using wood screws 12, as shown in FIG. 2, or other suitable fasteners (not shown). The decking planks 20 are formed of an extruded high impact, UV stabilized polymeric material, such as PVC plastic, and are easily cut with a hand saw or electric circular saw to any desired length. According to the embodiment disclosed, the width of the decking plank 20 is 5.750 inches, and the height is 1.625 inches. The maximum space between adjacent planks is approximately 0.25 inches. Numerous other dimensions are possible within the scope of the invention. Moreover, while a boat dock is illustrated in FIG. 1, the invention has further application in construction of patio decks, piers, walkways, balconies, and the like.

Figure 3:
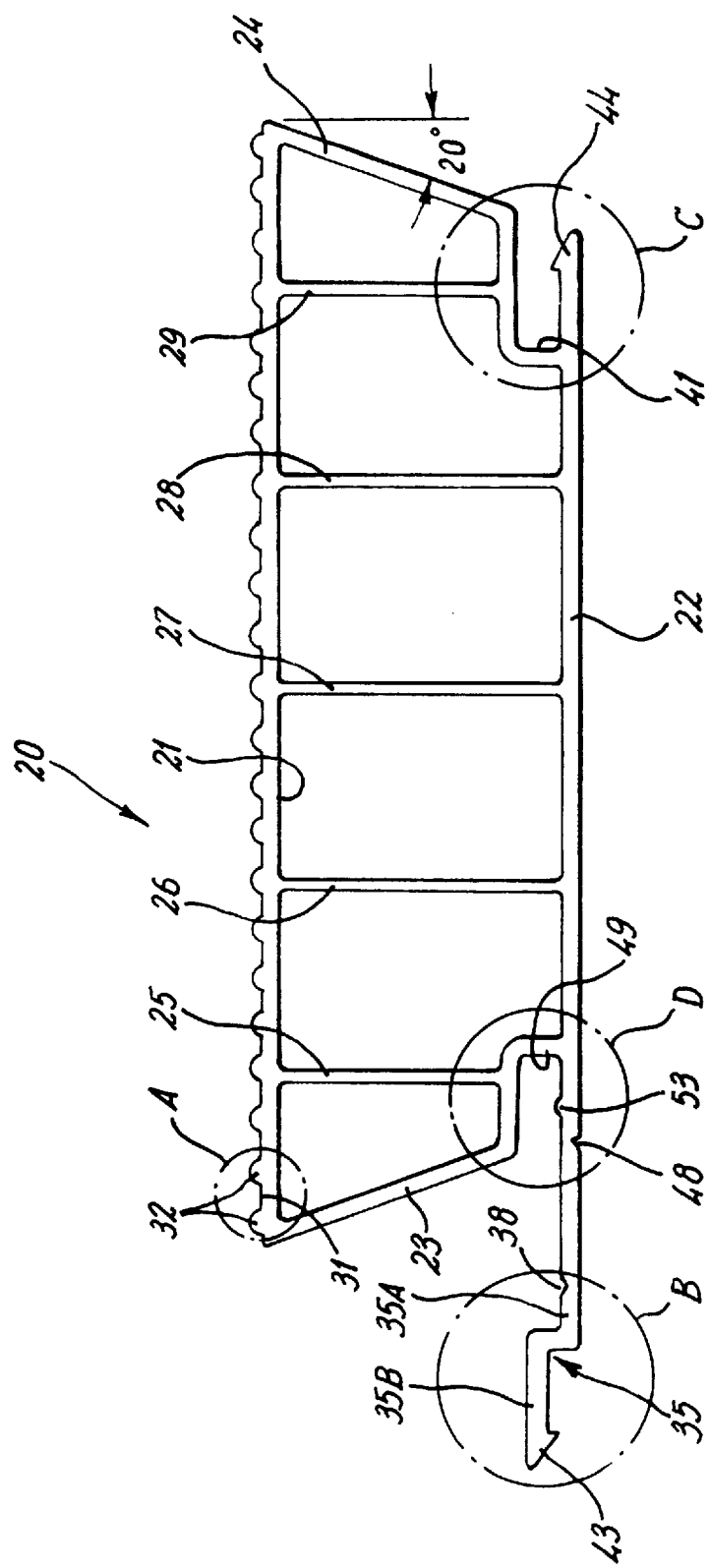
FIG. 3 is an end view of one of the decking planks shown in FIG. 2.

Referring to FIGS. 2 and 3, the decking plank 20 includes integrally-formed top and bottom walls 21 and 22, and opposing side walls 23 and 24. Integral reinforcing ribs 25, 26, 27, 28, and 29 are located between the side walls 23 and 24, and bridge the top and bottom walls 21 and 22. The ribs 25–29 extend longitudinally from one end of the decking plank 20 to the opposite end for increasing its load-resisting capacity. The side walls 23 and 24 converge towards the bottom wall 22 at an angle of about 20°.

Figure 4:
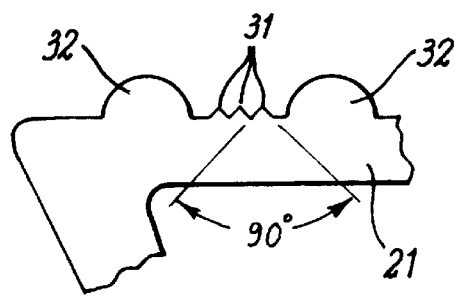
FIG. 4 is an enlarged view of the circled area 'A' in FIG. 3 showing a portion of the slip-resistant top surface of the decking plank.

A portion of the top wall 21 is illustrated in detail in FIG. 4. The top surface includes a number of alternately-spaced serrations 31 and risers 32 extending along the entire length of the decking plank 20, and laterally from one side edge of decking plank 20 to the other. In the illustrated embodiment, the serrations 31 extend 0.015 inches above the top surface of the decking plank 20, and are spaced approximately 0.030 inches apart from each other. The risers 32 extend 0.062 inches above the top surface, and are spaced approximately 0.25 inches apart. The rough texture provided by the serrations 31 and risers 32 creates a relatively slip-resistant decking surface.

Figure 5:
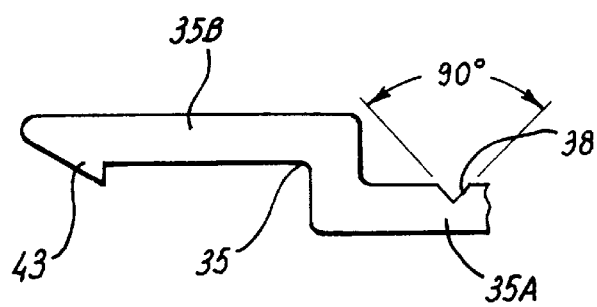
FIG. 5 is an enlarged view of the circled area 'B' in FIG. 3 showing an integrally-formed flange of the decking plank.
Figure 6:
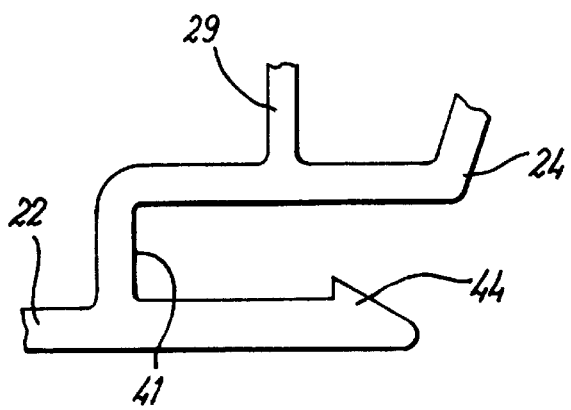
FIG. 6 is an enlarged view of the circled area 'C' in FIG. 3 showing an integrally-formed complementary channel of the decking plank.
Figure 7:
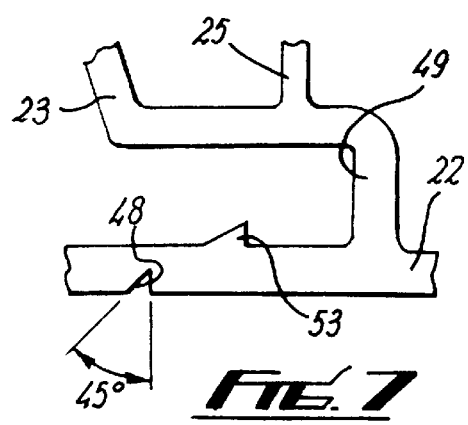
FIG. 7 is an enlarged view of the circled area 'D' in FIG. 3 showing an integrally-formed trim channel of the decking plank.

As shown in FIGS. 2, 3, and 5, an integrally-formed flange 35 extends outwardly from and along the bottom wall 22 on one side of the decking plank 20 along its entire length. The flange 35 includes a fastening portion 35A having a number of spaced openings 37 for receiving the wood screws 12 therethrough to the supporting joists 11, and for water drainage from a top surface of the decking structure 10. According to a preferred embodiment, the openings 37 are spaced 4.0 inches apart along the length of the flange 35 so that the planks 20 can be mounted to standard 16 inch centre joists. The unused openings 37 between the joists 12 are thus available for drainage.

In a modification the preformed openings 37 may be omitted, a small longitudinally extending groove 38 being formed in the flange 35 to help guide the screws 12 through the flange 35 and into the joists 11 of the subfloor. Enhanced water drainage may be achieved by sloping the decking plank 20 slightly from one end to the other. This embodiment of the invention without openings 37 is especially applicable for use in overhead decking whereby an area below the decking is sheltered from rain water runoff.

A connecting portion 35B of the flange 35 is integrally formed with the fastening portion 35A, and provided for attaching the decking plank 20 to an adjacent like plank. The connecting portion 35B extends outwardly in a plane above the fastening portion 35A and engages with a fastening channel 41 of the adjacent plank 20, as is best shown in FIG. 13.

The channel 41 is integrally formed along the bottom wall 22 on the side of the decking plank 20 opposite the flange 35. The channel 41 extends longitudinally along the entire length of the decking plank 20, and cooperates with the connecting portion 35B of the flange 35 to space the adjacent planks 20 from each other and to attach the adjacent planks 20 together. The connecting portion 35B and channel 41 include interfering shoulders 43 and 44 providing a snap-attachment to lock the adjacent decking planks 20 to each other while permitting a limited degree of relative lateral movement between them.

The top walls of the adjacent planks may thus abut one another or be spaced apart to a limited variable extent. Spacing of the top walls creates series of longitudinal slots in the upper surface of the decking structure, through which surface water may drain into the generally triangular recesses defined by the sloping side walls 23 and 24 of the adjacent planks and the connecting members 3 5. These recesses may also serve to accommodate electrical or other cables to supply services at spaced locations along the assembled structure. Moreover by virtue of the relatively loose engagement between the connecting members 35 and 41, a limited degree of angular movement is permitted between adjacent planks to accommodate irregularities in level of the supporting joists 11.

Figure 9:
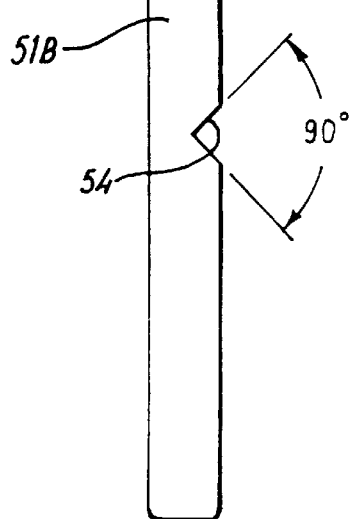
FIG. 9 is an end view of an elongate decking trim section for attachment to a longitudinal side of the decking plank.

A second channel or recess 49 is formed in the side wall 23 adjacent to the bottom wall 22 for receiving a flange portion 51A of decking trim 51 shown in FIGS. 1, 9, and 14. The decking trim 51 is used to finish an exposed side edge of the decking structure 10, as described further below.

Figure 8:
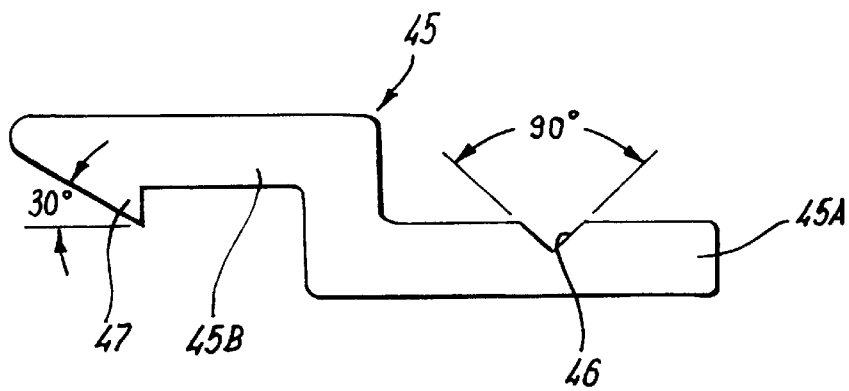
FIG. 8 is an end view of an elongate fastener strip used for initiating decking construction.

To construct the decking, an elongate fastener strip 45, shown in FIGS. 1, 8, and 15, is first mounted on the supporting joists 11 at a side edge "E1" of the decking structure. A longitudinally extending groove 46 is formed in a mounting portion 45A of the strip 45 for guiding wood screws 12 or other fasteners therethrough to the joists 11. A first decking plank 20 is placed on the joists 11, and its fastening channel 41 snap-attached to a locking portion 45B of the fastener strip 45. A locking shoulder 47 is formed with the portion 45B, and cooperates with the shoulder 44 of the channel 41 to lock the decking plank 20 and fastener strip 45 together while permitting a limited degree of relative lateral movement between them. Successive planks 20 are then snap-attached together by inserting the connecting portion of the flange 35 of one plank 20 into the channel 41 of an adjacent plank, as shown in FIG. 13. The planks 20 are secured one-by-one to the joists 11 by screws 12 as described above. The complementary connecting portions 35B and channels 41 of respective, adjacent planks 20 cooperate to space the planks 20 a predetermined distance from each other within the range of lateral adjustment permitted by the construction of these components. Separate spacers (not shown) may be used to achieve exact parallel spacing between adjacent planks.

Referring to FIGS. 1, 3, and 9, upon reaching a second side edge "E2" of the proposed decking structure, the flange 35 of the last fitted decking plank 20 is removed using a saw at a groove 48 formed at the junction of the bottom wall 22 and the flange 35. The groove 48 preferably extends along the entire length of the decking plank 20 and forms a parting line, as described above. After removing the flange 35, a locking portion 51A of a decking trim 51 is inserted into the trim channel 49 at the side edge "E2" of the decking structure 10. As best shown in FIG. 14, the portion 51A and the channel 49 include interfering shoulders 52 and 53 for providing a convenient snap-attachment to lock the trim 51 and decking plank 20 together. A groove 54 is formed in the web 51B of the decking trim 51 for receiving screws 12 to secure the trim 51 directly to the adjacent supporting joist 11. If desired the joists 11 may be covered with an elongate plastic or vinyl cladding (not shown).

Referring to FIGS. 1, 10, and 15, at an adjacent side edge "E3" of the decking structure 10, an elongate C-shaped cap 55 shown in FIGS. 10 and 15 may be applied to the exposed ends of the decking planks 20 to provide a more attractive and aesthetic side finish. The cap 55 includes spaced apart resilient arms 56 and 57 which slightly converge so that when they are spread and forced onto the exposed ends of planks 20, they frictionally engage the planks 20. One or more caps 55 may be used to finish the exposed side edge "E3". Alternatively, each plank 20 can be fitted with an end cover 61 such as shown in FIG. 11.

In addition, as shown in FIGS. 1 and 12, an elongate cover trim 62 of T-section may be positioned at mitered, abutting ends of decking planks 20 to provide a uniform and aesthetic transition between the planks 20. The T-section trim 62 includes a textured top surface with alternately spaced serrations 63 and risers 64, and a centre web 63 for locating between the abutting planks 20. The T-section trim 62 and end cap 55 may be further secured to the decking planks 20 with an adhesive or other suitable fastener if desired.

FIG. 16 shows a modified form of connecting means similar to that shown in FIG. 13 but in which the shoulders 143 and 144 have opposing sloping faces 143A, 143B and 144A, 144B. The sloping faces 143B and 144B replace the vertical abutting faces of the shoulders of FIG. 13 and facilitate disengagement of the connecting means and separation of adjacent planks if required. The cooperating shoulders on the trim components of FIGS. 8 and 9 and the shoulder 53 may also be modified in a similar manner.

The decking structure described has numerous advantages over previously proposed wooden or plastic decking structures. There are no exposed nails or other fasteners at the surface of the decking structure which require replacement, or could cause injury. The embossed top surface provides enhanced slip-resistance and the integral construction of the individual planks avoids the need to engage interfitting components to form each plank. The manner of interconnection of the planks permits limited lateral adjustment between adjacent planks to accommodate to different overall widths of substructure and provides multiple drainage slots to clear water rapidly from the assembled structure.

It should be appreciated that while the invention is primarily intended for use in the construction of marine walkways and decking, plank elements according to the invention may also be used to construct cladding, screen fencing or other forms of structure.

I claim:

1. An elongate modular construction element for assembly with a plurality of like elements to form a decking structure, said element being in the nature of a hollow plank comprising spaced top and bottom walls interconnected by opposed side walls, first connecting means projecting outwardly beyond one of said side walls of the plank, second connecting means complementary to said first connecting means being formed at the opposite side of the plank whereby two such planks may be connected together in side by side relation, the side walls of each plank converging in a direction towards said bottom wall so as to be adapted to define between adjacent interconnected planks a void of increasing width from the top to the bottom thereof, said connecting means being adapted to permit limited sliding movement of adjacent planks relative to one another in a direction transverse to the lengths of the planks and limited angular movement about an axis extending parallel to the lengths thereof whereby the top walls of adjacent planks may be angularly inclined relative to one another, said connecting means being located adjacent the bottom wall of and extending continuously along the plank from one end thereof to the other, and serving, when adjacent planks are connected together, to close off the bottom of said void.

2. A construction element according to claim 1, wherein said first connecting means comprises a laterally projecting flange including a fastening portion for receiving fasteners therethrough for attaching the plank to said supporting structure.

3. A construction element according to claim 2, wherein said flange includes a connecting portion extending in a plane parallel to but offset from the plane of said fastening portion.

4. A construction element according to claim 3, wherein said second connecting means comprises a channel extending adjacent said bottom wall at the opposite side of the plank from said first connecting means for receiving the connecting portion of said flange.

5. A construction element according to claim 4, including locking means comprising cooperating interfering shoulders formed respectively on the connecting portion of said flange and within said channel.

6. A construction element according to claim 2 including a longitudinally-extending groove formed in the fastening portion of said flange for guiding said fasteners therethrough to secure the plank to a supporting structure.

7. A construction element according to claim 2 including a plurality of spaced-apart holes formed in said fastening portion of said flange for accommodating passage of fasteners therethrough to a supporting structure.

8. A construction element according to claim 7 including a groove formed along the length of the fastening portion of said flange to enable removal of the flange from a plank positioned at an exposed edge of an assembled structure.

9. A construction element according to claim 1 including a further channel formed adjacent said first connecting means for receiving a trim member adapted to cloak the exposed edge of an assembled structure.

10. A construction element according to claim 1 including a plurality of reinforcing ribs located between said side walls and interconnecting said top and bottom walls.

11. A structure comprising a plurality of interconnected modular construction elements according to claim 1 assembled together on a supporting structure.

* * * * *